US012771570B2

(12) United States Patent
Nilsson et al.

(10) Patent No.: US 12,771,570 B2
(45) Date of Patent: Oct. 20, 2026

(54) PLATFORM-INDEPENDENT UNIFIED MODEL FOR SIMULATING A ROAD VEHICLE

(71) Applicant: Volvo Autonomous Solutions AB, Gothenburg (SE)

(72) Inventors: Peter Nilsson, Hovås (SE); Edo Drenth, Helsingborg (SE); Teo Jörlèn, Karlstad (SE); Ubaldo Tiberi, Gothenburg (SE); Mohamed Takkoush, Gothenburg (SE)

(73) Assignee: VOLVO AUTONOMOUS SOLUTIONS AB, Gothenburg (SE)

( * ) Notice: Subject to any disclaimer, the term of this patent is extended or adjusted under 35 U.S.C. 154(b) by 359 days.

(21) Appl. No.: 18/509,429

(22) Filed: Nov. 15, 2023

(65) Prior Publication Data

US 2024/0171423 A1 May 23, 2024

(30) Foreign Application Priority Data

Nov. 17, 2022 (EP) .................................... 22208080

(51) Int. Cl.
*H04L 12/40* (2006.01)

(52) U.S. Cl.
CPC .................. *H04L 12/40006* (2013.01); *H04L 2012/40273* (2013.01)

(58) Field of Classification Search
CPC ..... H04L 12/40006; H04L 2012/40273; G06F 30/20; G06F 30/00; G06F 30/15;
(Continued)

(56) References Cited

U.S. PATENT DOCUMENTS

| | | | | |
|---|---|---|---|---|
| 11,144,692 | B2 | 10/2021 | Drenth | |
| 11,268,823 | B2 * | 3/2022 | Yae | G05D 1/0088 |

(Continued)

FOREIGN PATENT DOCUMENTS

| | | | |
|---|---|---|---|
| CN | 104007665 | A | 8/2014 |
| CN | 109858181 | A | 6/2019 |

(Continued)

OTHER PUBLICATIONS

Extended European Search Report in corresponding European Application No. 22208080.6 dated May 12, 2023 (13 pages).

(Continued)

*Primary Examiner* — Rasheed Gidado
(74) *Attorney, Agent, or Firm* — Jeffri A. Kaminski; Venable LLP

(57) ABSTRACT

A method for providing a platform-independent unified simulation model representing a road vehicle includes a vehicle dynamic model configured to simulate a time evolution of at least one motion state of the vehicle, a plurality of actuator sub-models, each of which represents an actuator in the vehicle, configured to simulate a time evolution of a motion state under the action of the actuator controller sub-models representing electronic control unit, ECUs, which are configured to control the actuators on the basis of a sensed state of the vehicle and in accordance with predefined control logic, and to exchange bus messages with other ECUs, and a communication sub-model representing a data bus operable to deliver bus messages among ECUs.

12 Claims, 4 Drawing Sheets

(58) Field of Classification Search
CPC .......... G06F 11/20; G06F 11/00; G06F 11/15; G05B 17/02
See application file for complete search history.

(56) References Cited

U.S. PATENT DOCUMENTS

| | | | | |
|---|---|---|---|---|
| 11,436,484 | B2 * | 9/2022 | Farabet | G06F 18/24133 |
| 2005/0120320 | A1 * | 6/2005 | Uozumi | G06F 30/33 702/182 |
| 2014/0240447 | A1 * | 8/2014 | Cartwright | H04M 3/569 348/14.09 |
| 2017/0220712 | A1 | 8/2017 | Blesken et al. | |
| 2020/0001888 | A1 | 1/2020 | Pretsch et al. | |
| 2020/0074024 | A1 | 3/2020 | Levinson et al. | |
| 2021/0146941 | A1 * | 5/2021 | Okuda | H04W 4/44 |
| 2021/0398441 | A1 * | 12/2021 | Fok | G06F 11/3684 |
| 2022/0247678 | A1 * | 8/2022 | Atwal | H04L 45/645 |
| 2023/0286541 | A1 * | 9/2023 | Tescher | B60W 60/0015 |

FOREIGN PATENT DOCUMENTS

| | | | |
|---|---|---|---|
| CN | 209728744 | U | 12/2019 |
| CN | 111221326 | A | 6/2020 |
| CN | 114638105 | A | 6/2022 |
| EP | 4036780 | A1 | 8/2022 |
| JP | 2007310670 | A | 11/2007 |

OTHER PUBLICATIONS

Augustin Kebemou; "A Partitioning-Centric Approach for the Modeling and the Methodical Design of Automotive Embedded Systems Architectures"; Dissertation of the Faculty of Electrical Engineering and Computer Sciences, Jan. 1, 2008, XP055098496, Technical University of Berlin; Retrieved from the Internet: URL:http://opus4.kobv.de/opus4-tuberlin/files/1779/kebemou_augustin.pdf 180 pages.

Inaki Sainz et al: "X-in-the-Loop Simulation Environment for Electric Vehicles ECUs", 2021 IEEE Vehicle Power and Propulsion Conference (VPPC), IEEE, Oct. 25, 2021, pp. 1-6, XP034082671, DOI: 10.1109/VPPC53923.2021.9699126; 6 pages.

Peter Baumann et al: "Towards Virtual Validation of Distributed Functions", Jul. 22, 2019; Jul. 22, 2019-Jul. 24, 2019, Jul. 22, 2019, pp. 1-12, XP058445197; 12 pages.

Reorda Matteo Sonza: "Test of Automotive Boards", Master Degree In Computer Enginnering Embedded Systems, Jan. 1, 2019 (Jan. 1, 2019), XP055891294, Retrieved from the Internet: URL:https://webthesis.biblio.polito.it/12438/1/tesi.pdf; 93 pages.

Jianhui Luo et al: "Agent-based Real-time Fault Diagnosis", Aerospace Conference, 2005 IEEE, Piscataway, NJ, USA, Mar. 5, 2005, pp. 3632-3640, XP031330525, DOI: 10.1109/AER0.2005.1559668, ISBN: 978-0-7803-8870-3; 9 pages.

Jianhui Luo et al: "An Integrated Diagnostic Development Process for Automotive Engine Control Systems", IEEE Transactions on Systems, Man, and Cybernetics: Part C:Applications and Reviews, IEEE Service Center, Piscataway, NJ, US, vol. 37, No. 6, Nov. 1, 2007, pp. 1163-1173, XP011193921, ISSN: 1094-6977, DOI: 10.1109/TSMCC.2007.900659; 11 pages.

Garazi Juez et al; : "Early Safety Assessment of Automotive Systems Using Sabotage Simulation-Based Fault Injection Framework"; Aug. 17, 2017, SAT 2015 18th International Conference, Austin, TX, USA, Sep. 24-27, 2015; [Lecture Notes in Computer Science; Lect.Notes Computer], Springer, Berlin, Heidelberg, pp. 255-269, XP047425000, ISBN: 978-3-540-74549-5; 15 pages.

Jonathan D. Moore et al: "SIL, HIL, and Vehicle Fuel Economy Analysis of a Pre-Transmission Parallel PHEV", 2013 World Electric Vehicle Symposium and Exhibition (EVS27), IEEE, Nov. 17, 2013, pp. 1-7, XP032654154, DOI: 10.1109/EVS.2013.6914796; 7 pages.

Yasuhiro Ito et al: "Virtual Hils : A Model-Based Control Software Validation Method", SAE International Journal of Passenger Cars—Electronic and Electrical Systems, vol. 4, No. 1, Apr. 12, 2011, pp. 142-149, XP055754527, ISSN: 1946-4622, DOI: 10.4271/2011-01-1018; 8 pages.

Robert Lajos Bucs and Gerd Ascheid, "Multi-Scale Multi-Domain Co-Simulation for Rapid ADAS Prototyping," 2018 IEEE Asia Pacific Conference on Circuits and Systems (APCCAS), Chengdu, China, 2018, pp. 532-535, doi: 10.1109/APCCAS.2018.8605685; 4 pages.

Keroles Khalil et al; "SystemC FMU for Verification of Advanced Driver Assistance Systems"; Mentor, A Siemens Business, Cairo, Egypt; 9 pages.

Oliver Lenord et al; "eFMI: An open standard for physical models in embedded software"; Proceedings of the 14th International Modelica Conference; Sep. 20-24, 2021, Linköping, Sweden; DOI: 10.3384/ecp2118157; 57-71 pages; 15 pages.

* cited by examiner

PLATFORM-INDEPENDENT UNIFIED MODEL FOR SIMULATING A ROAD VEHICLE

TECHNICAL FIELD

The present disclosure relates to the field of computer-aided design and systems engineering relating to road vehicles. In particular, it proposes a method for providing a platform-independent unified simulation model that represents a road vehicle.

BACKGROUND

In the development of software and automation equipment for vehicles and machines, virtual testing finds widespread use. As argued in the research paper XP034082671 [I. Sainz, B. Arteta, A. Coupeau and P. Prieto, "X-in-the-Loop Simulation Environment for Electric Vehicles ECUs," 2021 *IEEE Vehicle Power and Propulsion Conference* (*VPPC*), Gijon, Spain, 2021, pp. 1-6, doi: 10.1109/VPPC53923.2021.9699126], X-In-the-Loop (XIL) simulation enables vast testing, occupies a manageable amount of time and can be initiated prior to the availability of the hardware. A testing application that implements XIL for Electronic Control Unit (ECU) testing for Electric Vehicles (EV) is described, which is claimed to significantly reduce the time and cost of the feature developments. The described testing application, which was compiled from a driver model, a powertrain model, a vehicle-dynamic model and various ECU models, has been designed for the purpose of testing the vehicle-related models included therein and for testing the hardware of the vehicle.

The availability of vehicle models which are realistic, computationally tractable, and easy to share plays a key role in virtual testing. Today, the usefulness of this development paradigm is still limited by the following factors:

- Development of autonomous software is cumbersome because it deals with a complex system, the vehicle, which is a combination of control algorithms on electronic control units (ECUs) and a dynamic behavior of the base vehicle.
- Developing code and testing on actual vehicles/machines is slow, and a complete vehicle model is required in a software-in-the-loop (SIL) environment to accelerate development. Commercial and administrative factors may constitute additional obstacles to code development: it is oftentimes challenging to get access to vehicles at all, and to access ECUs and wiring system in the vehicles.
- Sharing models with external partners poses some difficulties when it comes to the model interface and its representation of real vehicles.
- Even after the development of new algorithms, the integration of code on real vehicles requires significant effort.

It would be desirable to address the above difficulties directly, or to approach the virtual testing problem in ways that suffer to a lesser extent from these difficulties.

SUMMARY

One objective of the present disclosure is to propose a method for providing a platform-independent unified simulation model representing a road vehicle. A further objective is to propose a method for providing a unified simulation model which is executable on multiple platforms and conveniently transferable, as needed, between these platforms. A further objective is to propose a method for providing a simulation model which comprehensively captures all relevant subsystems of the road vehicle. In particular, the simulation model should be suitable for being executed autonomously. A further objective is to make available a simulation model that does not suffer from fragmentation issues and/or requires just a limited integration effort at the user end. A further objective is to make available a simulation model that realistically captures the behavior of actuators in the vehicle. A further objective is to make available a simulation model that realistically captures the behavior of inter-controller communication in the vehicle. A further objective is to make available a simulation model suitable as a testing environment for testing an autonomous-driving (AD) software stack. A still further objective is to propose a device for performing this method.

At least some of these objectives are achieved by the invention as defined by the independent claims. The dependent claims relate to advantageous embodiments of the invention.

In a first aspect of the present disclosure, there is disclosed a method for providing a platform-independent unified simulation model representing a road vehicle. The method comprises: providing a vehicle dynamic model configured to simulate a time evolution of at least one motion state of the vehicle; providing a plurality of actuator sub-models, each of which represents an actuator arranged in the vehicle, wherein the actuator model is configured to simulate a time evolution of a motion state or another state of the vehicle under the action of an actuator; providing a plurality of controller sub-models, each of which represents an electronic control unit (ECU), which is configured to control said at least one actuator in the vehicle on the basis of a sensed state of the vehicle in accordance with predefined control logic, and to exchange bus messages with other ECUs; providing a communication sub-model representing a data bus operable to deliver bus messages among ECUs; and forming a single executable including a combination of the vehicle dynamic model, the actuator sub-models, the controller sub-models and the communication sub-model.

A method with these features provides a simulation model that comprehensively captures the vehicle dynamics along with the behavior of actuators and controllers, as well as the communication among the controllers within the road vehicle. The simulation model is suitable for being executed autonomously or in a standalone fashion, namely, since it includes one or more complete feedback loops and/or since it does not require the injection of externally generated signals during the execution. In this respect, the proposed method differs purposefully from restbus simulation and related techniques, in which some network participants are real and some are simulated. In other words, the restbus simulation approach commonly includes adding the physical feedback from the vehicle, actuators and sensors on top of the simulation model. Because the simulation model can be executed autonomously, it may be described as a unified simulation model. A further advantage of the proposed method is the monolithic nature of the output, i.e., the simulation model is provided in the form of a single executable (e.g., computer-executable file) in no need of manual intervention to ensure integration and interoperability. The proposed method finally meets the requirement of realistically modeling the behavior of actuators, notably, since each actuator model is configured to simulate a time evolution of a motion state or another state of the vehicle under the action of an actuator.

A notable advantage of an executable representing a model is that this executable can be used for running freely configurable simulations, e.g., federated simulations where multiple instances of the same model are deployed in a common simulation environment. In federated simulations, it is possible to let the different copies of the model execute in their own respective threads or on their own respective servers, and they can communicate with each other or interact in other ways. A comparable degree of versatility is usually not possible if an already configured simulation application (such as a compiled testing application) is shared, as the testing engineer would not be locked to the architecture that the application's developer has chosen. Only with access to an executable representing a model is the testing engineer free to use the model for further purposes; for example, the testing engineer then is able add further instances of the model as desired, to select on which processing resources they are to execute, and so forth.

In some embodiments, the method provides a simulation model that further includes a fault injection interface, which is operable to perturb a state of the vehicle during the simulation. This makes the simulation model even more complete in the sense that it can be used for testing the vehicle's ability to operate under stress (e.g., tire blow-up), to recover from an initial error condition, and to handle similar challenges.

In some embodiments, all or some of the controller sub-models are encapsulated with a platform-independent interface. In the same or other embodiments, the single executable is encapsulated with a platform-independent interface. This ensures that the simulation model, or its parts, is executable in substantially unchanged form on multiple platforms. The use of the platform-independent interface also facilitates the sharing of the simulation model from one platform to another platform. The interface may for example be a Functional Mock-up Interface (FMI™).

In some embodiments, each controller sub-model is configured to represent a packing operation into a message format of the data bus and/or an unpacking operation from this message format. These embodiments meet the requirement of realistically modeling the behavior of inter-controller communication in the vehicle. The controller sub-models may as well mimic delays, data-packet losses and other imperfections associated with the data bus.

Independent protection is claimed for the single executable, which is the output of the above-described method. The executable may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

In a second aspect of the present disclosure, there is provided a method for testing software, in particular controller software, such as ECU software or software for a controller that represents a 'driver' in an autonomous vehicle. The method can also be used to test software forming part of an autonomous driving (AD) software stack. This software belonging to the AD software stack then takes the role of the system-under-test (SUT), and the unified simulation model acts as a testing environment for evaluating the AD software stack. According to good testing practices, the testing environment should be neutral in the sense that it neither conceals errors and other unwanted behaviors of the SUT, nor introduces new errors as artefacts. The method comprises: obtaining (controller) software; providing a platform-independent unified simulation model in accordance with the first aspect; and executing a predefined test on the platform-independent unified simulation model. The simulation model includes one or more controller sub-models that are configured with control logic in accordance with the (controller) software to be tested.

In some embodiments within the second aspect, the platform-independent unified simulation model is distributed from a first execution platform, on which it has been provided, to a second execution platform, on which the test will be executed.

In some embodiments, the test is executed on a high layer (i.e., one of the upper layers) of an autonomous driving stack.

In a third aspect of the present disclosure, there is provided a device and a computer program product for performing one or more of the methods outlined above.

Generally speaking, the third aspect shares the effects and advantages to be expected for the first and second aspects, and it can be embodied with a corresponding degree of technical variation.

The computer program may contain instructions for causing a computer, or said device in particular, to carry out the method. The computer program may be stored or distributed on a data carrier, as discussed above.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figure 1B:
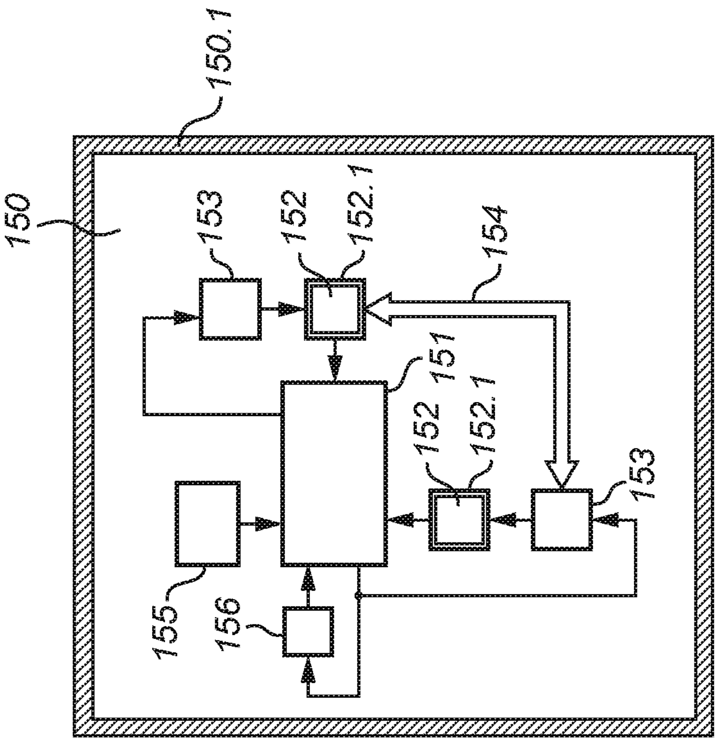
FIG. 1B is a block diagram showing a functional structure of a unified simulation model of the road vehicle in FIG. 1A.
Figure 1A:
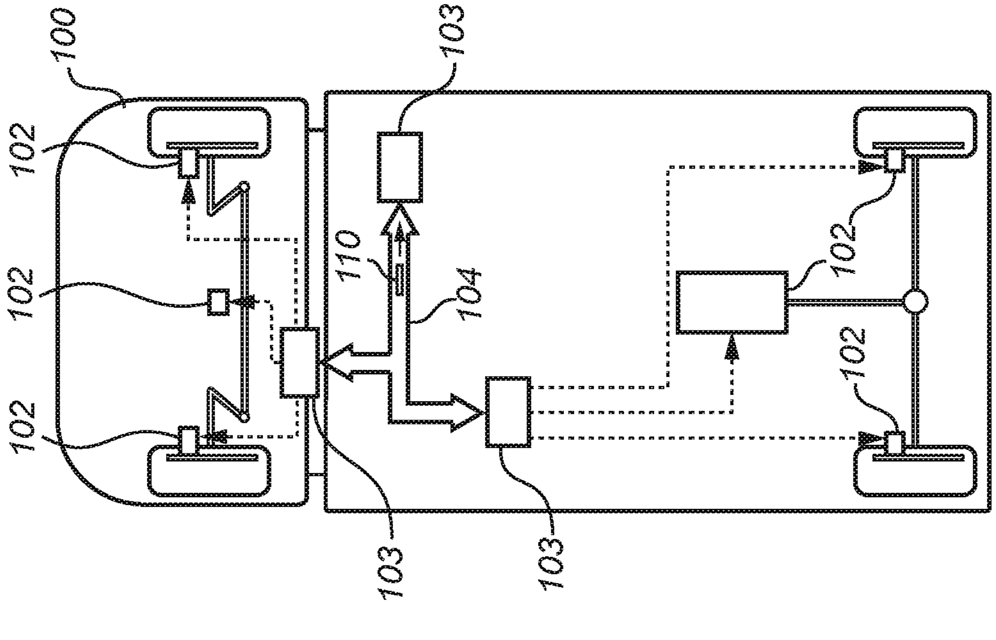
FIG. 1A is a top view of a heavy commercial road vehicle including actuators, electronic control units and a data bus.

FIG. 1A is a top view of a road vehicle 100 including actuators 102, electronic control units (ECUs) 103 and a data bus 104 configured to deliver bus messages 110 among the controllers 103. The road vehicle 100 may be a heavy commercial vehicle, such as a truck, a bus, an agricultural vehicle, an all-terrain vehicle or construction equipment. The term "road vehicle" does not extend to railroad vehicles. The road vehicle 100 may be a conventional vehicle, an autonomous vehicle (AV), which is either completely self-driving or has a lower degree of autonomy.

The road vehicle 100 is shown equipped with two steered wheels on a front axle and two driven wheels on a rear axle. All wheels are braked. The movements of the vehicle 100 are largely controlled by the action of the actuators 102, including brakes, a steering system and an engine. The engine is generally designed to accelerate the vehicle, but it may optionally have a regenerative braking capability, allowing energy to be converted and stored in a battery, capacitor, flywheel, hydrogen tank or the like.

Each of the ECUs 103 is configured to control one or more of the actuators 102 in the vehicle 100. To do so, the ECU 103 generates a control signal to be supplied to the actuator(s) 102, namely, by applying predefined control logic to a state of the vehicle. The state may be a motion state (position, speed, acceleration, orientation, angular speed, angular acceleration etc.), mass, loading, presence of trailer, internal operational state (technical health, engine parameters, battery/fuel level etc.), environmental variables (road friction, wind, temperature, precipitation, altitude, geo-position, illumination etc.) or the like. The state of the vehicle may be sensed using one or more sensors (not shown) arranged in the vehicle or in the environment where it operates. Signals from the sensors may be processed in view of calibration data, estimation models and similar secondary information. The ECU 103 may be further configured to read and process sensor signals. The control logic normally includes a control gain, i.e., the amount by which a deviation from a setpoint value is to be corrected and/or with what delay, signal bandwidth, time-integration period etc.

An ECU 103 may further be configured to communicate with one or more further ECUs 103 over the data bus 104. The communication may take place in the form of an exchange of bus messages 110, such as discrete data packets traveling on the data bus 104. The inter-ECU communication modality can be advantageously used to coordinate or synchronize the ECUs 103 in a vehicle. Another possible benefit of inter-ECU communication is to share sensor data or vehicle-state data. A still further use of inter-ECU communication is to delegate the authority to control an actuator 102 coupled to one ECU 103 from this ECU 103 to one or more further ECUs 103.

The data bus 104 can be configured to use any protocol carried over ethernet or similar network technologies. For example, the data bus 104 may act as—or include—a Controller Area Network (CAN) interface, a CANopen interface, a CAN-FD interface, a FlexRay™ interface, a Local Interconnect Network (LIN) interface, a Data Distribution Service (DDS) interface, or a combination of one or more of these interfaces. The data bus 104 may further support AUTOSAR™, Protocol Buffers (Protobuf™), Nanoph, HTTP, and/or restbus, although some of these may not necessarily be regarded as complete data bus interfaces.

With reference to the flowchart in FIG. 2, there will now be described a method for providing a platform-independent unified simulation model 150 (FIG. 1B). The method, generally corresponding to step 212 in FIG. 2, may be embedded into a software testing method 200. The method to be described can be performed by a device with the general functional properties illustrated in FIG. 3.

Here, the device 310 comprises processing circuitry 312 and a memory 314 suitable for storing the simulation model 150 or other executables 316. The processing circuitry 312 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device. The memory 314 may be a storage medium or a runtime memory. Further, the device 310 may include an input device interface (not shown), e.g., input device interface and/or output device interface. The input device interface may be configured to receive input and selections to be communicated to the device 310 when executing instructions, such as from a keyboard, mouse, touch-sensitive surface, etc. The device 310 may further include an external interface (not shown) allowing it to communicate with at least one analogously configured further device 320 via a communication network 390 (local-area network, wide-area network, intranet, extranet, Internet), and/or with a server 330 or another host computer.

The devices 310, 320 may be operable to provide two different execution platforms or execution environments. In particular, notably thanks to the platform-independent characteristics of the simulation model 150, an executable representing the simulation model 150 may be distributed (i.e., shared, transmitted) from said device 310 to the further device 320, or vice versa. This allows the software testing method 200 to be executed by two or more cooperating devices 310, 320.

To provide the platform-independent unified simulation model 150 (FIG. 1B), the method begins with a step of providing 212.1 a vehicle dynamic model 151 configured to simulate a time evolution of at least one motion state of the vehicle (see above). As used herein, the vehicle dynamic model is a model of the dynamics of the base vehicle, which could include motion in three dimensions. The dynamics include the motion and generated forces in the vehicle's chassis and its tires. The vehicle's dynamics (forces, torques, rotations, accelerations etc.) can be modeled based on first-principle physics equations. The fidelity of the vehicle dynamic model 151 depends on the use case at hand.

The vehicle dynamic model 151 is, like the further elements of the unified simulation model 150, suitable for enabling a computer-implemented simulation of the corresponding vehicle subsystem, here, the vehicle dynamics. It is understood that a computer-implemented simulation of a technical system is determined by, on the one hand, a model or equations representing the technical system and, on the other hand, algorithms for solving the model or equations during execution. If a preexisting platform is used for executing the simulation model 150, such as Functional Mock-up Interface (FMI™) or Simulink™, it may suffice to provide the model or equations in a suitable format, and the solving is taken care of by the platform. Accordingly, the vehicle dynamic model 151 may be provided by expressing the kinematic and/or dynamic equations of the road vehicle's 100 state in FMI™ or Simulink™ language in evaluable form, i.e., with numerical values of mass, vehicle geometry, and any further constants and coefficients in these equations. FMI™ may allow the vehicle-dynamic equations to be formulated in the C programming language. Expressed in standard mathematical form, a linear vehicle dynamic model could have the following appearance:

$$\begin{cases} x'(t) = Ax(t) + Bu(t) \\ y(t) = Cx(t) + Du(t) \end{cases} \quad (1)$$

where t denotes time, x is a vector of one or more motion states, u is a vector of one or more control signals, and A, B, C, D are constant matrices, which are constant with respect to time if the vehicle dynamics are time-invariant. An alternative form allowing one or more nonlinear relationships to be included may look as follows:

$$\begin{cases} x'(t) = f(x(t), u(t), t) \\ y(t) = g(x(t), u(t), t) \end{cases} \quad (2)$$

Here, the time dependence of functions f, g is absent if the vehicle dynamics are assumed to be time-invariant. The form (1) or (2) may as well be used to express the sub-models that form part of the simulation model 150.

In a next step 212.2 of the method, a plurality of actuator sub-models 152 are provided, each of which represents one or more of the actuators 102 arranged in the road vehicle 100. The actuator model 152 is configured to simulate a time evolution of a motion state or another state of the road vehicle 100 under the action of an actuator 102. To mention one example, one of the actuator models 152 may represent a friction brake and specify, for this purpose, the magnitude of the braking torque or braking force that is produced for different values of the brake control signal (e.g., brake pressure relative to a neutral pressure). In other words, the actuator model 152 provides an understanding of the effect on the vehicle's state that is to be expected when a certain value is assigned to the actuator's control signal. Further, if the braking torque or braking force varies with the current speed of the road vehicle 100, this variation can be captured by the actuator sub-model 152. The actuator model 152 may alternatively relate to a powertrain component. It is not uncommon for commercial component manufacturers to provide models of their actuators in a standardized format, and these could be used as actuator models 152 in the present method.

Moreover, the controller sub-model 152 may optionally be configured to represent a packing operation into a message format of the data bus 104, or an unpacking operation from this message format, or a combination of these.

In a further step 212.3 of the method, there is provided a plurality of controller sub-models 153, each of which represents an ECU 103 in the vehicle 100. In view of the discussion above, it is understood that the controller sub-model 153 shall absorb elements of the control logic in the ECU 103, whether its quantitative aspects (e.g., values of control gains), qualitative aspects or a combination of these. As suggested in FIG. 1B, each controller sub-model 153 is configured to read a state of the vehicle at the upstream side and to output a control signal at the downstream side, where it may have an impact on the vehicle's state.

In a next step 212.4, a communication sub-model 154 representing the data bus 104 is provided. It is recalled that a main functionality of the data bus 104 is to deliver bus messages 110 between pairs of ECUs 103. The communication sub-model 154 captures the use of a single message and/or signal definition. In the example of a CAN or CAN-FD bus, such definitions may be deposited in a database file (DBC) file, which specifies how to encode physical or human-readable values into a format acceptable for use with the data bus 104, as well as corresponding decoding operations from the data-bus format. The communication sub-model 154 may further model the packing and unpacking functions in the (simulated) ECUs 103, as discussed above. Further still, the communication sub-model 154 may reflect specifics of the non-perfect connection between the cooperating ECUs 103 that the data bus 104 provides, with deterministic and non-deterministic delays, packet losses etc. It is noted that the communication sub-model 154 may support the use of communication databases designed to mitigate transcript errors, including manual errors.

In an optional step 212.5, there is further provided a fault injection interface 155, which is operable to perturb a state of the road vehicle 100 during an ongoing simulation. This makes the simulation model more versatile, in that it can additionally be used for testing the vehicle's ability to operate under stress, to recover from an initial error condition, and to handle similar challenges. The fault injection interface 155 may be actively used for discrete periods of a simulation or a software test, e.g., in accordance with an operator's desire or with a pre-specified test schedule. After the fault has been injected, the control logic in the simulated vehicle will attempt to recover from the fault and stabilize the vehicle towards a regular condition.

The actuator sub-model 152, controller sub-models 153, communication sub-model 154 and fault injection interface 155, if any, may all be specified in a same or similar format as the vehicle dynamic model 151. Some or all of the models 151, 152, 153, 154, 155 may be encapsulated with a platform-independent interface, allowing it to be interpreted and/or executed sensibly without modification on multiple platforms. This is suggested by the additional frames 152.1 surrounding the respective controller sub-models 152 in FIG. 1B. The platform-independent interface 152.1 may be an application programming interface (API). The interface 152.1 may be a Functional Mock-up Interface (FMI™). In particular, one or more of the models 151, 152, 153, 154, 155 may be expressed as a Functional Mock-up Unit (FMU), in particular a Co-Simulation (CS) FMU. This option, among others, could allow the underlying physics to be simulated at rates faster than the control logic in the respective ECUs 103.

In a final step 212.6 of the method, a single executable (or a single binary) is formed which includes a combination of the vehicle dynamic model 151, actuator sub-model 152, controller sub-models 153, communication sub-model 154 and fault injection interface 155, if any, which together represents the unified simulation model 150. Accordingly, if the simulation model 150 is to be shared, e.g. from the first device 310 to the second device 320 in FIG. 3, only this executable needs to be transferred to or made available to the second device 320. The single executable representing the simulation model 150 can be created, for example, as a dynamic-link library (DLL) in a Microsoft Windows™ architecture or as a so-called shared object in a Linux™ context. Optionally, to further facilitate sharing, the single executable may be encapsulated with a platform-independent interface, as discussed just above.

In some embodiments, the unified simulation model 150 further includes at least one further sub-model 156. The further sub-model(s) 156 may represent a safety supervisor, a base vehicle control algorithm and/or another vehicle subsystem. It is understood that a safety supervisor may have authority to override one or more ECUs 103 in the vehicle, and force actuators 102 to take a particular, safety-oriented action. A base vehicle control algorithm may include algorithms that control vehicle motion management from a higher level. The (motion) requests of a base vehicle control algorithm can then be handed over to actuator controllers for execution. The base vehicle control logic can also represent state machines and switches, i.e. in a non-continuous control mode. The further sub-model(s) 156 may be formatted like the other models and included in the single executable.

Figure 2:
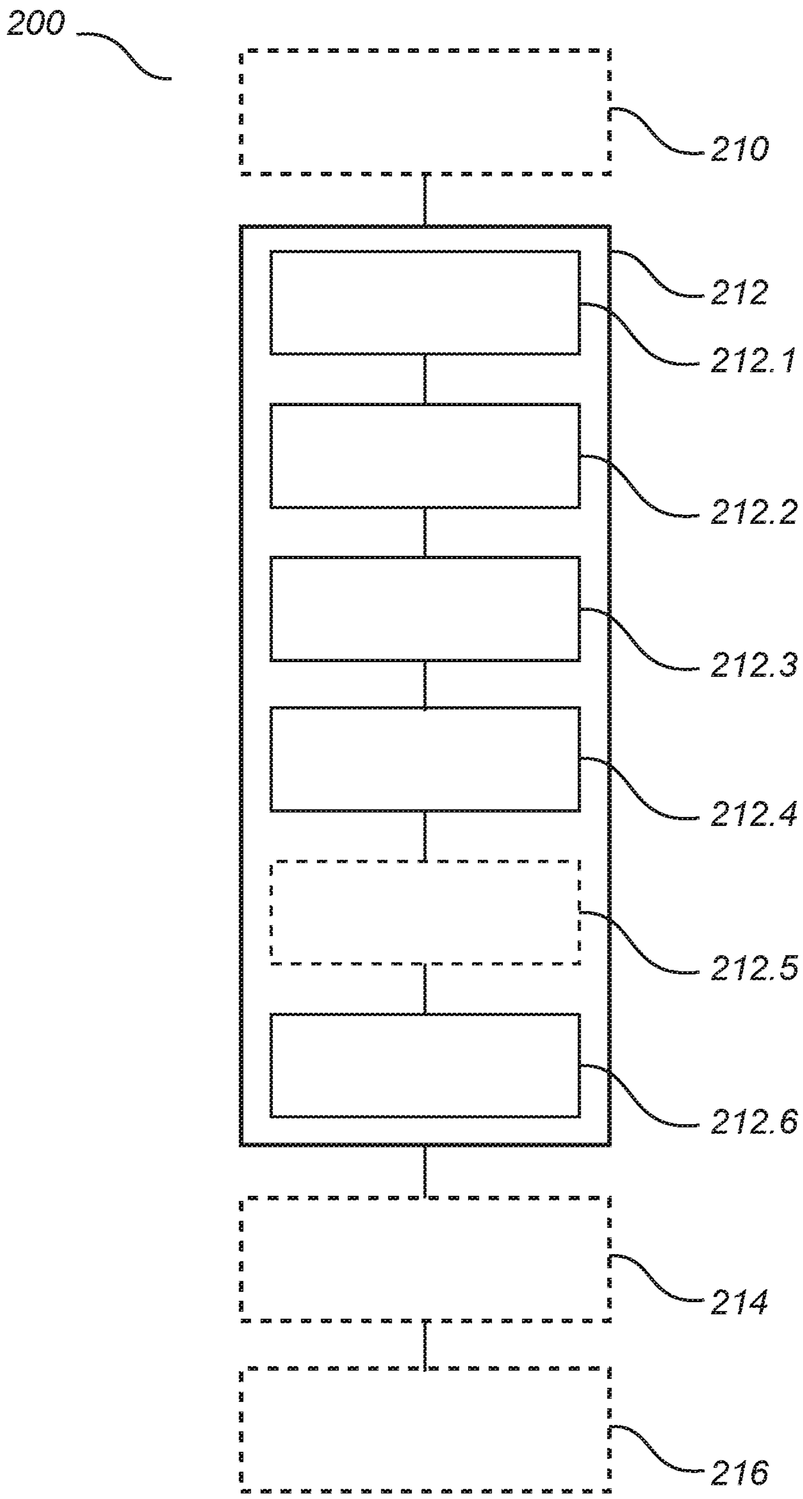
FIG. 2 is a flowchart of a method for providing a platform-independent unified simulation model representing a road vehicle, according to embodiments herein.
Figure 3:
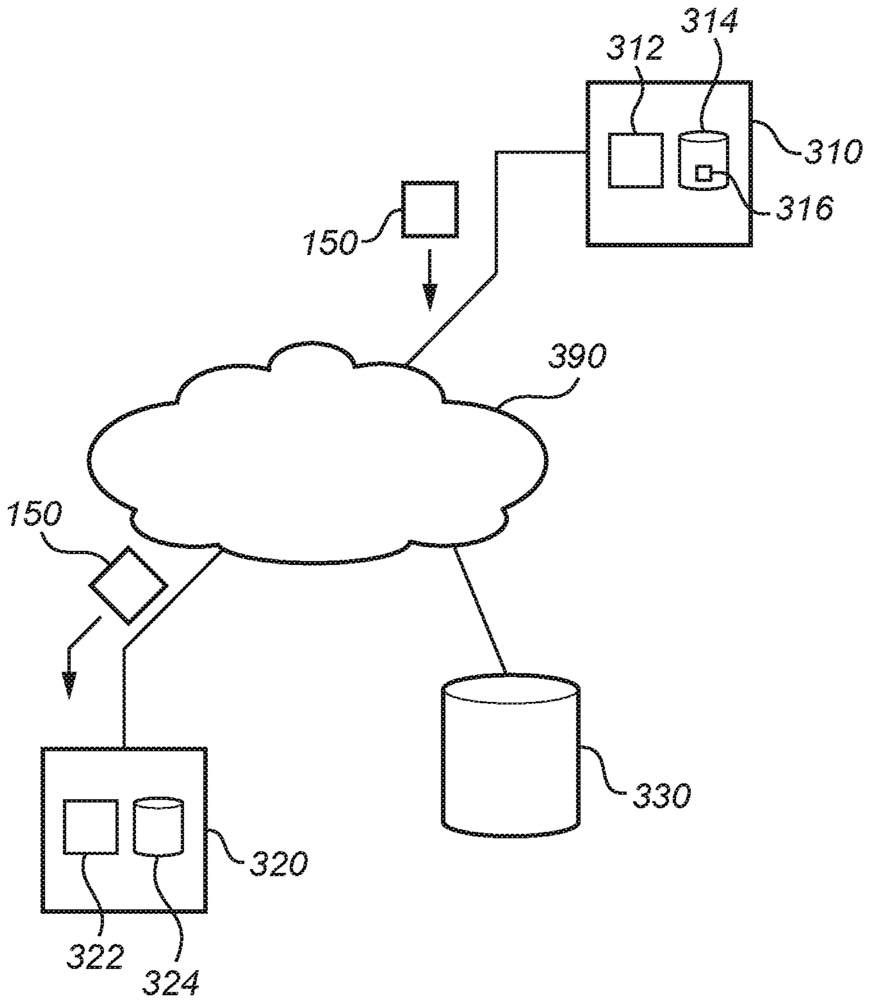
FIG. 3 shows a data network with devices configured to provide and/or use a unified vehicle simulation model.

FIG. 2 shows a software testing method 200 in which the unified simulation model 150 of the road vehicle 100 is put to use. Step 212 in the software testing method 200 may be understood as an act of obtaining a simulation model 150, i.e., the output of steps 212.1 through 212.6. Possibly, however, the steps 212.1 through 212.6 may have been executed in advance, and/or they may have been executed by a different device than the one performing steps 210, 214 and/or 216 of the software testing model. Although such work sharing in time or among devices may imply a need to transfer or share the simulation model 150, the platform-independent characteristics of the simulation model 150 greatly simplify this process.

The software testing method 200 will be described in an example where ECU software is to be tested, i.e., the ECU software constitutes so-called software-in-the-loop (SIL). In a first step 210, controller software is provided, e.g., generated based on a requirement specification, or received from a sender, retrieved from a shared memory, or the like. Without departing from the scope of the present disclosure, the software testing method 200 may target software to be executed on other vehicle subsystems and/or be a component of an autonomous driving (AD) software stack. The primary impact of the choice of SIL is that the performance of this software will be assessed after an execution of the software testing method 200 and the software could be replaced or improved before the next execution. In a given execution of the method 200, however, it might not be discernable whether the controller software or another software element in the road vehicle 100 is the SIL.

Next, in a second step 212, a platform-independent unified simulation model 150 as described above is provided. In the simulation model 150, one or more of the controller sub-models 153 are configured with control logic in accordance with the controller software to be tested. It is recalled that the simulation model 150 may be provided by means of an earlier execution of substeps 212.1 through 212.6 (on the same device as executes the earlier and/or later steps of the testing method 200), after which the resulting single executable which represents the simulation model 150 has been stored. Alternatively, the simulation model 150 may be provided by causing a different device to execute substeps 212.1 through 212.6, so that the single executable becomes available for use in the software testing. If the simulation model 150 has been provided by another device, the testing method 200 will include a step 214 of distributing the simulation model 150 from said other device (first execution platform) to the device that executes the remainder of the testing method 200 (second execution platform).

In a next step 216, a predefined test is executed on the platform-independent unified simulation model 150 thus provided. The test may include exposing the simulated road vehicle 100 to a predefined stimulus or condition, and observing the behavior of the vehicle. If the behavior is not satisfactory, the controller software under test may need further improvement, and the test may have to be rerun. By virtue of the standalone characteristics of the simulation model 150 discussed above, the test can be carried out without a need for further input from an operator and/or without signals generated by external simulated or real devices.

Figure 4:
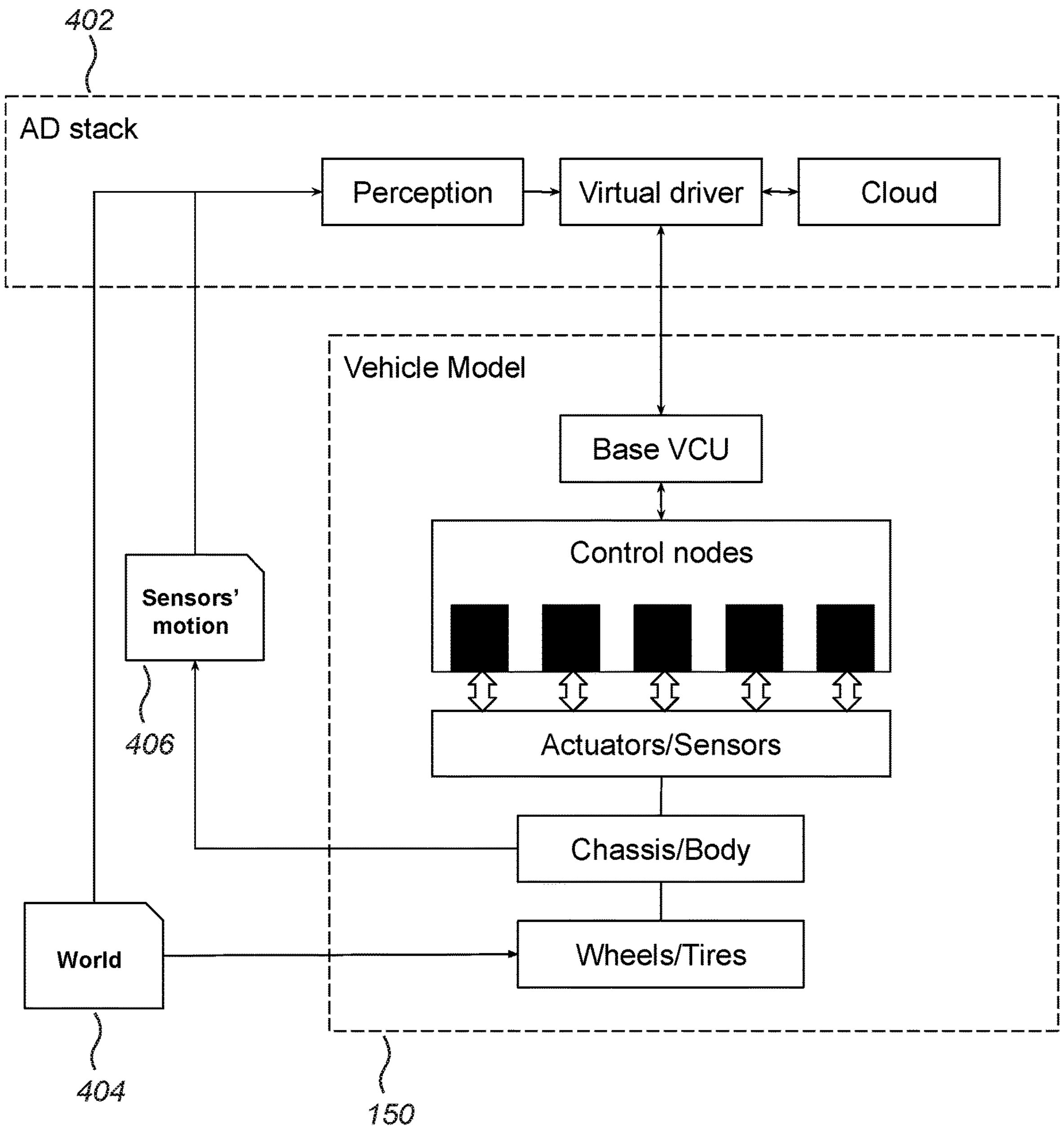
FIG. 4 is a block diagram illustrating interactions between an autonomous-driving (AD) software stack under test and a testing environment comprising a simulation based on a unified vehicle simulation model.

A further use of the method 200 is to perform a test on an AD software stack. FIG. 4 is a block diagram showing the interaction of an AD software stack 402 and a model-based simulation which is based on a simulation model 150 with the characteristics described above. The evolution of the simulation may optionally be guided by injecting signals representing interaction with the simulated physical world 404 and/or simulated sensor data 406. The AD software stack, which is a special case of controller software, can be modeled as an ECU 103 in the road vehicle 100, i.e., in the form of a controller sub-model 153. The AD software test may be designed for observing how the actions of the AD software stack influence the operation of the simulated road vehicle 100 in view of safety, traffic fluency, energy consumption, mechanical wear etc. In particular, the test may include a (functional) regression test of the AD software stack. The method 200 may be especially suitable for assessing the performance of the higher layers of the AD software stack (e.g., application layer), and improving these accordingly.

Common to these use cases, the AD software stack 402 takes the place of a human driver in a conventional vehicle. With the techniques disclosed herein, the simulation model 150 can be provided in such manner that the AD software stack interacts with a communication interface that strongly resembles, or is identical to, the interface of the real road vehicle 100. Because the AD software stack is unaware that it communicates with a simulation rather than a real road vehicle 100, the test results are likely to be very accurate.

As illustrated by the example of FIG. 4, the test setup used in the method 200 may be free from physical interfaces between the simulated vehicle 100 and the AD software stack 402. Although the simulation model 150 may send the position and velocity vectors of a sensor position 406, there will not be any feedback that will alter this sensor position; rather the position and velocity vectors may be used for sensor models in another domain.

To summarize, the present disclosure proposes a simulation model which can be given the following properties:

- The simulation model can be conveniently shared with external partners. The model may include a complete system including control logic, safety supervisors, vehicle dynamics, actuator models and communication interfaces. If the FMI/FMU format is used, the sub-models are conveniently packetized as 'black boxes' yet allows for complete system sharing using a standardized interface. This accelerates collaboration and integration with external partners.
- By sharing a complete and/or monolithic simulation model of a vehicle under development, the model becomes available to SIL environments (including dynamics, control, interface etc.) early. As such, it is possible to perform complete testing in simulation of a system-under-test (SUT) to be included in the vehicle, and hence accelerate the development of the AD software stack.
- Interface and integration testing is possible even before going to vehicle.
- A complete vehicle model provides a closed loop performance. This is to say, the SUT gets feedback all the way down from the base vehicle's motion and the performance of the respective ECUs. This allows for faults to be propagated just like they do in a real vehicle.

Because the proposed solution is entirely virtual, it scales advantageously and allows distributed (i.e., networked, or 'cloud') implementations. It therefore supports the vision of testing/validation for 'a million miles', which has been formulated for autonomous vehicles.

If an interface for fault injection on low base vehicle level is included in the simulation mode, different fault modes that a SUT must handle can be tested. For example, developers may explore the impact of a tire blow-up, which suddenly changes the dynamic characteristics of the vehicle motion (e.g., steering, braking, orientation), and these effects propagate to the base vehicle control algorithms. The effects will furthermore reach the SUT (e.g., AD software stack), whose ability to handle the blow-up can be studied. For these reasons, the presence of a fault injection interface in the simulation model broadens the usefulness of closed-loop simulations and allows extreme test scenarios to be explored in an entirely safe environment.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for testing an autonomous driving ("AD") software stack, comprising:
- obtaining an AD software stack;
- providing a platform-independent unified simulation model representing a road vehicle, said providing comprising:
- providing a vehicle dynamic model configured to simulate a time evolution of at least one motion state of the vehicle;
- providing a plurality of actuator sub-models, each of which represents an actuator arranged in the vehicle, wherein the actuator model is configured to simulate a time evolution of a motion state or another state of the vehicle under the action of an actuator;
- providing a plurality of controller sub-models, configured with control logic in accordance with the AD software stack, wherein each of the controller sub-models represents an electronic control unit, ECU, which is configured
  - to control said at least one actuator in the vehicle on the basis of a sensed state of the vehicle in accordance with predefined control logic, and
  - to exchange bus messages with other ECUs;
- providing a communication sub-model representing a data bus operable to deliver bus messages among ECUs; and
- forming a single executable including a combination of the vehicle dynamic model, the actuator sub-models, the controller sub-models and the communication sub-model, wherein the single executable is encapsulated with a platform-independent interface; and
- executing a predefined test on the AD software stack using the platform-independent unified simulation model.

2. The method of claim 1, wherein each controller sub-model is encapsulated with a platform-independent interface.

3. The method of claim 2, wherein the platform-independent interface is a Functional Mock-up Interface.

4. The method of claim 1, wherein each of the actuator sub-models is configured to represent a control signal's effect on the vehicle's state.

5. The method of claim 1, wherein each controller sub-model is configured to represent a packing operation into a message format of the data bus and/or an unpacking operation from this message format.

6. The method of claim 1, wherein the communication sub-model is configured to represent a data bus configured to deliver messages that include discrete data packets.

7. The method of claim 1, wherein the communication sub-model is configured to represent one or more of the following:
- a Controller Area Network ("CAN") interface,
- a CANopen interface,
- a CAN-Flexible Data-Rate interface,
- a FlexRay interface,
- a Local Interconnect Network ("LIN") interface,
- a Data Distribution Service ("DDS") interface.

8. The method of claim 1, further comprising:
- providing at least one further sub-model representing one or more of the following:
- a safety supervisor,
- a base vehicle control algorithm,
- a vehicle subsystem.

9. The method of claim 1, further comprising:
- distributing the platform-independent unified simulation model from a first execution platform, on which it has been provided, to a second execution platform, on which the test will be executed.

10. The method of claim 1, wherein the test includes a regression test, in particular a functional regression test, of the autonomous driving software stack.

11. A device comprising processing circuitry and memory, the device being configured to perform the method of claim 1.

12. A non-transitory computer program medium storing program code representing a platform-independent unified simulation model representing a road vehicle in the form of a single executable, wherein the single executable has been provided by the method of claim 1.

* * * * *